(12) United States Patent
Li et al.

(10) Patent No.: US 11,040,337 B2
(45) Date of Patent: Jun. 22, 2021

(54) LOW-SILICA CHABAZITE ZEOLITES WITH HIGH ACIDITY

(71) Applicant: PQ CORPORATION, Valley Forge, PA (US)

(72) Inventors: Hong-Xin Li, Lansdale, PA (US); Anton Petushkov, Malvern, PA (US); Lifeng Wang, Bryn Mawr, PA (US); Bjorn Moden, West Chester, PA (US)

(73) Assignee: PQ Corporation, Valley Forge, PA (US)

( * ) Notice: Subject to any disclaimer, the term of this patent is extended or adjusted under 35 U.S.C. 154(b) by 0 days.

(21) Appl. No.: 16/398,465

(22) Filed: Apr. 30, 2019

(65) Prior Publication Data

US 2020/0061594 A1    Feb. 27, 2020

Related U.S. Application Data

(60) Provisional application No. 62/664,917, filed on Apr. 30, 2018.

(51) Int. Cl.
| | |
|---|---|
| *C01B 39/48* | (2006.01) |
| *B01J 29/70* | (2006.01) |
| *B01D 53/94* | (2006.01) |
| *B01J 29/72* | (2006.01) |
| *B01J 37/04* | (2006.01) |
| *B01J 37/08* | (2006.01) |
| *B01J 37/30* | (2006.01) |
| *F01N 3/20* | (2006.01) |
| *B01J 29/76* | (2006.01) |

(52) U.S. Cl.
CPC ........ *B01J 29/723* (2013.01); *B01D 53/9418* (2013.01); *B01J 29/7015* (2013.01); *B01J 29/763* (2013.01); *B01J 37/04* (2013.01); *B01J 37/08* (2013.01); *B01J 37/30* (2013.01); *C01B 39/48* (2013.01); *F01N 3/2073* (2013.01); *C01P 2004/61* (2013.01); *C01P 2004/62* (2013.01); *C01P 2006/37* (2013.01); *F01N 2370/04* (2013.01); *F01N 2610/02* (2013.01)

(58) Field of Classification Search
CPC .. C01B 39/48; C01P 2004/61; C01P 2004/62; C01P 2006/37; B01J 29/7015; B01J 29/763; B01D 53/9418; B01D 2255/50
See application file for complete search history.

(56) References Cited

U.S. PATENT DOCUMENTS

| | | | |
|---|---|---|---|
| 9,889,436 B2* | 2/2018 | Ariga | B01D 53/9418 |
| 2014/0112852 A1* | 4/2014 | Mohanan | B01D 53/8628 |
| | | | 423/213.2 |
| 2017/0107114 A1* | 4/2017 | Gounder | B01J 29/7015 |
| 2020/0061594 A1* | 2/2020 | Li | B01D 53/9418 |

* cited by examiner

*Primary Examiner* — David M Brunsman
(74) *Attorney, Agent, or Firm* — Finnegan, Henderson, Farabow, Garrett & Dunner, LLP

(57) ABSTRACT

A microporous crystalline material having a molar silica to alumina ratio (SAR) ranging from 10 to 15 and a fraction of Al in the zeolite framework of 0.63 or greater is disclosed. A method of selective catalytic reduction of nitrogen oxides in exhaust gas that comprises contacting exhaust gases, typically in the presence of ammonia, urea, an ammonia generating compound, or a hydrocarbon compound, with an article comprising the disclosed microporous crystalline is also disclosed. Further, a method of making the disclosed microporous crystalline material is disclosed.

24 Claims, 3 Drawing Sheets

LOW-SILICA CHABAZITE ZEOLITES WITH HIGH ACIDITY

TECHNICAL FIELD

The present disclosure relates generally to low-silica chabazite (CHA) zeolites having a high fraction of Al in the zeolite framework and hence high acidity, a method of producing low silica CHA zeolites, and methods of selective catalytic reduction using the disclosed zeolites.

BACKGROUND

Nitric oxides (NOx) have long been known to be polluting gases, principally by reason of their corrosive action. In fact, they are the primary reason for the cause of acid rain. A major contributor of pollution by NOx is their emission in the exhaust gases of diesel automobiles and stationary sources such as coal-fired power plants and turbines. To avoid these harmful emissions, SCR is employed and involves the use of zeolitic catalysts in converting NOx to nitrogen and water.

Thus, there is a continuing need for improved microporous crystalline material that has enhanced performance and hydrothermal stability properties to allow for the selective catalytic reduction of NOx in exhaust gases.

Aluminosilicate CHA-type zeolites are important components in commercial selective catalytic reduction (SCR) systems for NOx abatement in automotive applications. Due to the extreme conditions that automotive SCR catalysts are exposed to during operation, commercial CHA zeolites are required to display high thermal and hydrothermal stability.

Disclosed herein are zeolite materials and method of making such materials that are directed to overcoming one or more of the problems set forth above and/or other problems of the prior art.

SUMMARY

There is disclosed a material that comprises a microporous crystalline material having a molar silica to alumina ratio (SAR) ranging from 10 to 15 and a fraction of Al in the zeolite framework of 0.63 or greater as determined by n-propylamine adsorption.

There is also disclosed a method of selective catalytic reduction of nitrogen oxides in exhaust gas. In an embodiment, the method comprises at least partially contacting exhaust gases with an article comprising a microporous crystalline material having a molar silica to alumina ratio (SAR) ranging from 10 to 15 and a fraction of Al in the zeolite framework of 0.63 or greater as determined by n-propylamine adsorption. The contacting step may be performed in the presence of ammonia, urea, an ammonia generating compound, or a hydrocarbon compound.

There is also disclosed a method of making microporous crystalline material described herein, e.g., having a molar silica to alumina ratio (SAR) ranging from 10 to 15 and a fraction of Al in the zeolite framework of 0.63 or greater as determined by n-propylamine adsorption. In an embodiment, the method comprises mixing sources of alumina, silica, alkali metal, an organic structure directing agent and water to form a gel, heating the gel in an autoclave to form a crystalline CHA product, and calcining said CHA product.

BRIEF DESCRIPTION OF THE DRAWINGS

The accompanying figures are incorporated in and constitute a part of this specification.

DESCRIPTION

Definitions

Figure 1:
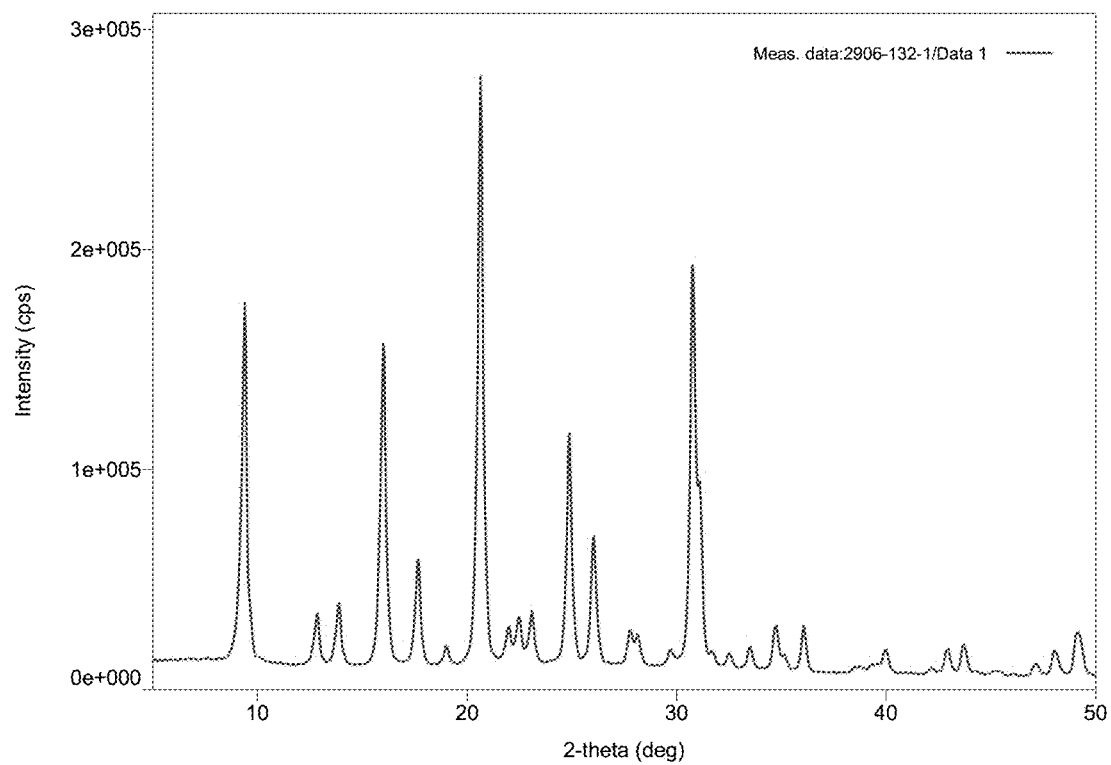
FIG. 1. is an X-ray diffraction pattern of an inventive chabazite product made according to Example 1.

"Hydrothermally stable" means having the ability to retain a certain percentage of initial surface area and/or microporous volume after exposure to elevated temperature and/or humidity conditions (compared to room temperature) for a certain period of time. For example, in one embodiment, it is intended to mean retaining at least 65%, such as at least 70%, at least 80%, at least 90%, or even at least 95%, of its surface area, micropore volume and XRD pattern intensity after exposure to conditions simulating those present in an automobile exhaust, such as temperatures up to 800° C., including temperatures ranging from 700 to 800° C., such as from 775 to 800° C., in the presence of up to 10 volume percent (vol %) water vapor for times ranging from up to 1 hour, or even up to 16 hours, such as for a time ranging from 1 to 16 hours.

"Initial Surface Area" means the surface area of the freshly made crystalline material before exposing it to any aging conditions.

"Micropore volume" is used to indicate the total volume of pores having a diameter of less than 20 angstroms. "Initial Micropore Volume" means the micropore volume of the freshly made crystalline material before exposing it to any aging conditions. The assessment of micropore volume is particularly derived from the BET measurement techniques by an evaluation method called the t-plot method (or sometimes just termed the t-method) as described in the literature (Journal of Catalysis 3, 32 (1964)).

Herein "mesopore volume" is the volume of pores having a diameter of greater than 20 angstroms up to the limit of 600 angstroms.

Similarly, "micropore area" refers to the surface area in pores less 20 angstroms, and "mesopore area" refers to the surface area in pores between 20 angstroms and 600 angstroms.

The "acidity" is the amount of Bronsted acid sites in the zeolite material expressed as mmol Bronsted acid sites per gram of zeolite. Herein, the amount Bronsted acid sites is determined by adsorption of n-propylamine. Each Al that resides in a zeolite framework position gives rise to one Bronsted acid site.

The "fraction of Al in the zeolite framework" is the ratio of the number of Bronsted acid sites determined by n-propylamine adsorption and the total amount of Al in the material determined by elemental analysis.

"Defined by the Structure Commission of the International Zeolite Association," is intended to mean those structures included but not limited to, the structures described in "Atlas of Zeolite Framework Types," ed. Baerlocher et al. Sixth Revised Edition (Elsevier 2007), which is herein incorporated by reference in its entirety.

"Double-6-rings (d6r)" is a structural building unit described in "Atlas of Zeolite Framework Types," ed. Baerlocher et al., Sixth Revised Edition (Elsevier 2007), which is herein incorporated by reference in its entirety.

"Selective Catalytic Reduction" or "SCR" refers to the reduction of $NO_x$ (typically with urea and/or ammonia) in the presence of oxygen to form nitrogen and $H_2O$.

"Exhaust gas" refers to any waste gas formed in an industrial process or operation and by internal combustion engines, such as from any form of motor vehicle.

The phrases "chosen from" or "selected from" as used herein refers to selection of individual components or the combination of two (or more) components. For example, catalytically active metal described herein may be chosen from copper and iron, which means the metal may comprise copper, or iron, or a combination of copper and iron.

Applicants have discovered a useful microporous crystalline material having a high acidity, e.g., greater than 1.35, and low silica amount, e.g., a molar silica to alumina ratio (SAR) ranging from 10 to 15, such as from 10-14, or from 12-14, or even 13-14. The disclosed materials are particularly useful for selective catalytic reduction of nitric oxides.

The useful range for acidity is determined by, and thus a function of total Al content. For example, at an SAR ranging from 13-14 SAR, acidity typically ranges from 1.35 to 1.8 mmol/g, such as 1.40 to 1.75 mmol/g, or 1.50 to 1.70 mmol/g. More generally, for a material having an SAR ranging from 10-15, acidity typically ranges from 1.35-2.0 mmol/g, such as 1.40 to 2.0 mmol/g, or 1.50 to 2.0 mmol/g, or 1.60 to 2.0 mmol/g, or 1.70 to 2.0 mmol/g, or even 1.80 to 2.0 mmol/g.

The useful ranges for the fraction of Al in the zeolite framework are 0.63 or greater, such as 0.63 to 1.00, or 0.65 to 1.00, or 0.70 to 1.00.

In an embodiment, the microporous crystalline material may comprise a crystal structure having structural code of CHA (chabazite).

In an embodiment, the microporous crystalline material may further comprise at least one catalytically active metal, such as copper or iron. In an embodiment, the catalytically active metal comprises copper (Cu), which is present in a Cu:Al atomic ratio of at least 0.25.

In an embodiment, the microporous crystalline material described herein comprises a large crystal material, such as one having a mean crystal size ranging from 0.5 to 5 microns, as determined by SEM analysis.

In an embodiment, there is disclosed a microporous crystalline material having a CHA structure, with a molar silica to alumina ratio (SAR) ranging from 10 to 15, such as 12-14, and a fraction of Al in the zeolite framework of 0.63 or greater, such as 0.63 to 1.0 or even 0.65 to 1.0 as determined by n-propylamine adsorption. The acidity of the material made according to this embodiment typically ranges from 1.35 to 1.8 mmol/g. The microporous crystalline material of this embodiment, further comprising at least one catalytically active metal, with copper or iron being the metals of choice. When the catalytically active metal comprises copper (Cu), it should be present in a Cu:Al atomic ratio of at least 0.25. In addition, the microporous crystalline CHA material of this embodiment ideally has a mean crystal size ranging from 0.5 to 5 microns.

There is also disclosed a method of selective catalytic reduction of nitrogen oxides in exhaust gas. In an embodiment, the method comprises at least partially contacting the exhaust gases with an article comprising a microporous crystalline material described herein. For example, the disclosed method of SCR comprises at least partially contacting the exhaust gases with an article comprising a microporous crystalline material having a CHA structure, with a molar silica to alumina ratio (SAR) ranging from 10 to 15, such as 12-14, and a fraction of Al in the zeolite framework of 0.63 or greater, such as 0.63 to 1.0 or even 0.65 to 1.0 as determined by n-propylamine adsorption. The acidity of the material used in this method typically ranges from 1.35 to 1.8 mmol/g. The CHA materials used in this method of SCR further comprise at least one catalytically active metal, with copper or iron being the metals of choice. When the catalytically active metal comprises copper (Cu), it should be present in a Cu:Al atomic ratio of at least 0.25. In addition, the microporous crystalline CHA material used in this method of SCR embodiment ideally has a mean crystal size ranging from 0.5 to 5 microns.

The contacting step of this method of SCR is typically performed in the presence of ammonia, urea, an ammonia generating compound, or a hydrocarbon compound.

There is also described a method of making microporous crystalline material described herein. In an embodiment, the method comprises mixing sources of alumina, silica, alkali containing additive, an organic structure directing agent, and water to form a gel. The method further comprises heating the gel in an autoclave to form a crystalline CHA product, and calcining said CHA product.

In an embodiment, the method further comprises introducing at least one catalytically active metal, such as copper or iron, into the microporous crystalline material by liquid-phase or solid-phase ion exchange, impregnation, direct synthesis or combinations thereof.

In an embodiment, the catalytically active metal comprises copper (Cu), which is present in a Cu:Al atomic ratio greater than 0.24, such as at least 0.25.

The method described herein uses an organic structure directing agent to form the resulting zeolite material. In an embodiment, the organic structure directing agent comprises N,N,N-Trimethyl-1-adamantylammonium hydroxide.

In an embodiment, the alkali containing additive comprises a source of potassium, sodium or a mixture of sodium and potassium. Examples include potassium hydroxide, potassium aluminate, sodium hydroxide and sodium aluminate, respectively.

In an embodiment, the sources of aluminum include but are not limited to sodium aluminate, aluminum salts, aluminum hydroxide, aluminum containing zeolites, aluminum alkoxides, or alumina. The sources of silica can include but are not limited to sodium silicate, potassium silicate, silica gel, silica sol, fumed silica, silica-alumina, zeolites, silicon alkoxides, or precipitated silica.

In an embodiment, the gel is heated in the autoclave at a temperature ranging from 120-200° C. for 1-100 hours, such as 180° C. for 48 hours. The gel can be stirred at 150 RPM. The method may further comprise filtering the gel to form a solid product, rinsing the solid product with DI water, drying the rinsed product, calcining the dried product, and ammonium-exchanging the calcined product.

Measurement Techniques:

Surface Area Measurements.

Surface area was determined in accordance with the well-known BET (Brunauer-Emmett-Teller) nitrogen adsorption technique, also referred to as the "BET method." Herein the general procedure and guidance of ASTM D4365-95 is followed in the application of the BET method to the materials according to the present disclosure. To ensure a consistent state of the sample to be measured, all samples are pretreated. Suitable pretreatment involves heating the sample, for example to a temperature of 400 to 500° C., for a time sufficient to eliminate free water, such as 3 to 5 hours. In one embodiment, the pretreatment consists in heating each sample to 500° C. for 4 hours.

Micropore Volume Measurements.

The assessment of micropore volume is particularly derived from the BET measurement techniques by an evaluation method called the t-plot method (or sometimes just termed the t-method) as described in the literature (Journal of Catalysis 3, 32 (1964)).

Acidity Measurements.

n-propylamine was used as a probe molecule for determining the acidity of the CHA materials, since n-propylamine selectively chemisorbs (chemically adsorbs) on the Bronsted acid sites of CHA. A thermal gravimetric analyzer (TGA) system was used for the measurement, where physically adsorbed n-propylamine was removed by heating to 280° C., and chemically adsorbed n-propylamine was determined from the weight change in a temperature range of 280-500° C. The acidity (acid site density) values were calculated in the unit of mmol/g from the weight change between 280° C. and 500° C. Reference is made to D. Parrillo et al., *Applied Catalysis, vol.* 67, pp. 107-118, 1990, which is incorporated by reference with respect to the acidity value calculation.

SCR Catalytic Tests.

The activities of the hydrothermally aged materials for $NO_x$ conversion, using $NH_3$ as reductant, were tested with a flow-through type reactor. Powder zeolite samples were pressed and sieved to 35/70 mesh and loaded into a quartz tube reactor. The gas composition for $NH_3$—SCR was 500 ppm NO, 500 ppm $NH_3$, 5 vol % $O_2$, 0.6% $H_2O$ and balance $N_2$. The space velocity was 50,000 $h^{-1}$. The reactor temperature was ramped between 150 and 550° C. and NO conversion was determined with an MKS MultiGas infrared analyzer at each temperature point.

XRD Retention.

The XRD peak areas for Cu-exchanged fresh and steamed samples were measured to calculate the XRD retention, i.e. the fraction of the original XRD peak area that was retained following the steam treatment. The XRD peaks between 19-32 degrees two-theta were used in the area calculations. The XRD retention was calculated by taking the ratio of the peak area of the steamed sample and the peak area of the sample before steaming.

EXAMPLES

The following non-limiting examples, which are intended to be exemplary, further clarify the present disclosure.

Example 1—Synthesis of 14 SAR CHA 1009 grams of DI water, 155 grams of N,N,N-Trimethyl-1-adamantylammonium hydroxide (Sachem, 25 wt % solution), 12 grams of potassium hydroxide (EMD Millipore, 71.4 wt % $K_2O$), and 2 grams of sodium hydroxide (Southern Ionics, 50 wt % solution) were first mixed together. 276 grams of silica sol (Nalco, 40 wt % $SiO_2$) was then added to the mixture. 47.5 grams of sodium aluminate (Southern Ionics, 23.5 wt % $Al_2O_3$) was next added to the mixture. 0.7 grams of as-synthesized chabazite zeolite powder (14 SAR) was then added. The molar composition of the gel was [16.8 $SiO_2$:1.0 $Al_2O_3$:0.8 $K_2O$:1.7 $Na_2O$:1.7 TMAAOH:672 $H_2O$]. The resulting gel was crystallized at 180° C. for 48 hours in a stainless steel autoclave (Parr Instruments, 2000 ml) while stirring at 150 RPM. The recovered solid was filtered, rinsed with DI water and dried in air at 105° C. overnight. The as-synthesized product had the X-ray diffraction pattern of chabazite, a $SiO_2/Al_2O_3$ ratio (SAR) of 13.5 as summarized in Table 1. The XRD pattern of Example 1 is shown in FIG. 1. The average SEM crystal size of Example 1 is 1.4 microns.

Example 2—Calcination of 14 SAR CHA at 550° C.

The dried zeolite powder from Example 1 was calcined in air for 1 hour at 450° C., followed by 6 hours 550° C. using a ramp rate of 3° C./min. After calcination, the sample was ammonium exchanged with an ammonium nitrate solution. After the ammonium exchange, the sample had an SAR of 13.5, $Na_2O$ of 0.00 wt % and $K_2O$ of 0.22 wt %. The acidity of the ammonium-exchanged sample determined by n-propylamine adsorption was 1.60 mmol/g. The ammonium exchanged sample exhibited the properties summarized in Table 1.

Example 3—Cu-Exchange of Example 2

The ammonium exchanged zeolite from Example 2 was Cu-exchanged with Cu-nitrate to achieve a CuO content of 5.0 wt % CuO. This Cu-exchanged material was further steamed at 800° C. for 16 hours in 10% $H_2O$/air.

Figure 2:
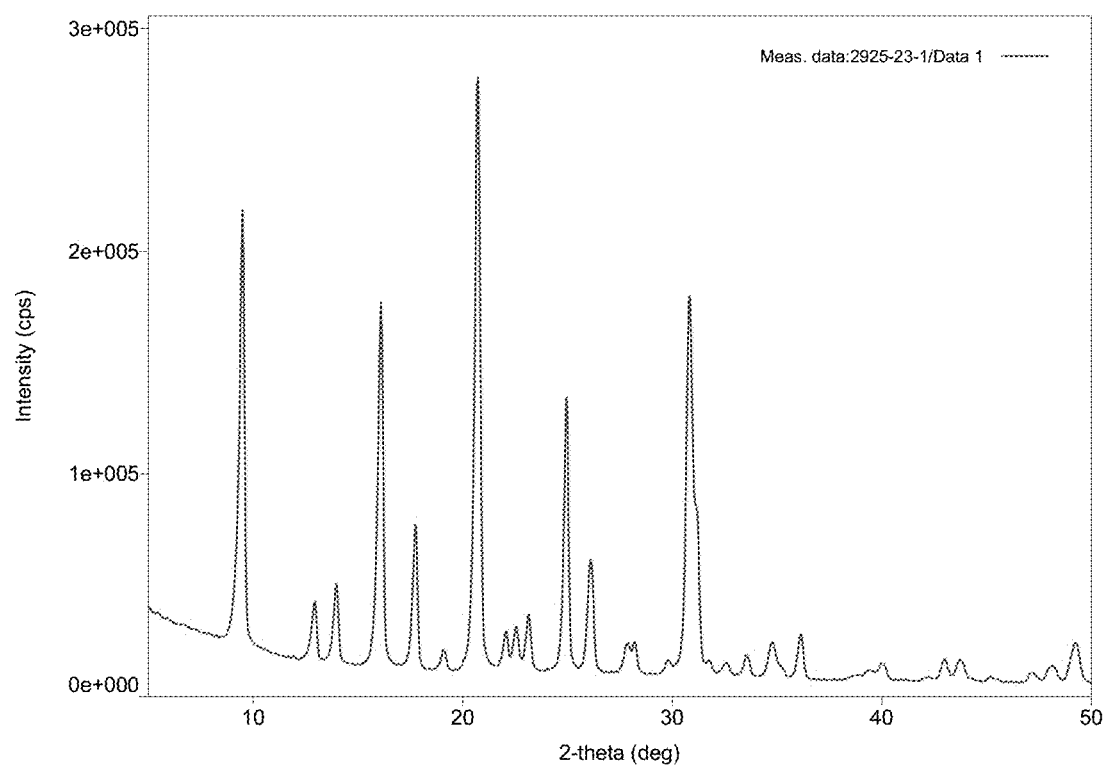
FIG. 2. is an X-ray diffraction pattern of an inventive chabazite product made according to Example 4.

Example 4—Synthesis of 12 SAR CHA 375 grams of DI water, 273 grams of N,N,N-Trimethyl-1-adamantylammonium hydroxide (Sachem, 25 wt % solution), 16 grams of potassium hydroxide (EMD Millipore, 71.4 wt % $K_2O$), and 12 grams of sodium hydroxide (Southern Ionics, 50 wt % solution) were first mixed together. Next 605 grams of silica sol (Nalco, 40 wt % $SiO_2$) was added to the mixture. Then 97 grams of sodium aluminate (Southern Ionics, 23.5 wt % $Al_2O_3$) was added to the mixture. Next, 120 grams of aluminum sulfate solution (7.6 wt % $Al_2O_3$) was added. Finally, 3.3 grams of seed material with CHA topology was added. The molar composition of the gel was [12.5 $SiO_2$:1.0 $Al_2O_3$:0.4 $K_2O$:1.3 $Na_2O$:1.0 TMAAOH:188 $H_2O$]. The resulting gel was crystallized at 160° C. for 48 hours in a stainless-steel autoclave (Parr Instruments, 2000 ml) while stirring at 150 RPM. The recovered solid was filtered, rinsed with DI water and dried in air at 105° C. overnight. The as-synthesized product had the X-ray diffraction pattern of chabazite, a $SiO_2/Al_2O_3$ ratio (SAR) of 12.3 as summarized in Table 1. The XRD pattern of Example 4 is shown in FIG. 2. The average SEM crystal size of Example 4 is 0.9 microns.

Example 5—Calcination of 12 SAR CHA at 550° C.

The dried zeolite powder from Example 4 was calcined in air for 1 hour at 450° C., followed by 6 hours 550° C. using a ramp rate of 3° C./min. After calcination, the sample was ammonium exchanged with an ammonium nitrate solution. After the ammonium exchange, the sample had an SAR of 12.3, $Na_2O$ of 0.00 wt % and $K_2O$ of 0.13 wt %. The acidity of the ammonium-exchanged sample determined by n-propylamine adsorption was 1.79 mmol/g. The ammonium exchanged sample exhibited the properties summarized in Table 1.

Example 6—Cu-Exchange of Example 5

The ammonium exchanged zeolite from Example 5 was Cu-exchanged with Cu-nitrate to achieve a CuO content of 5.0 wt % CuO. This Cu-exchanged material was further steamed at 775° C. for 16 hours in 10% $H_2O$/air.

Figure 3:
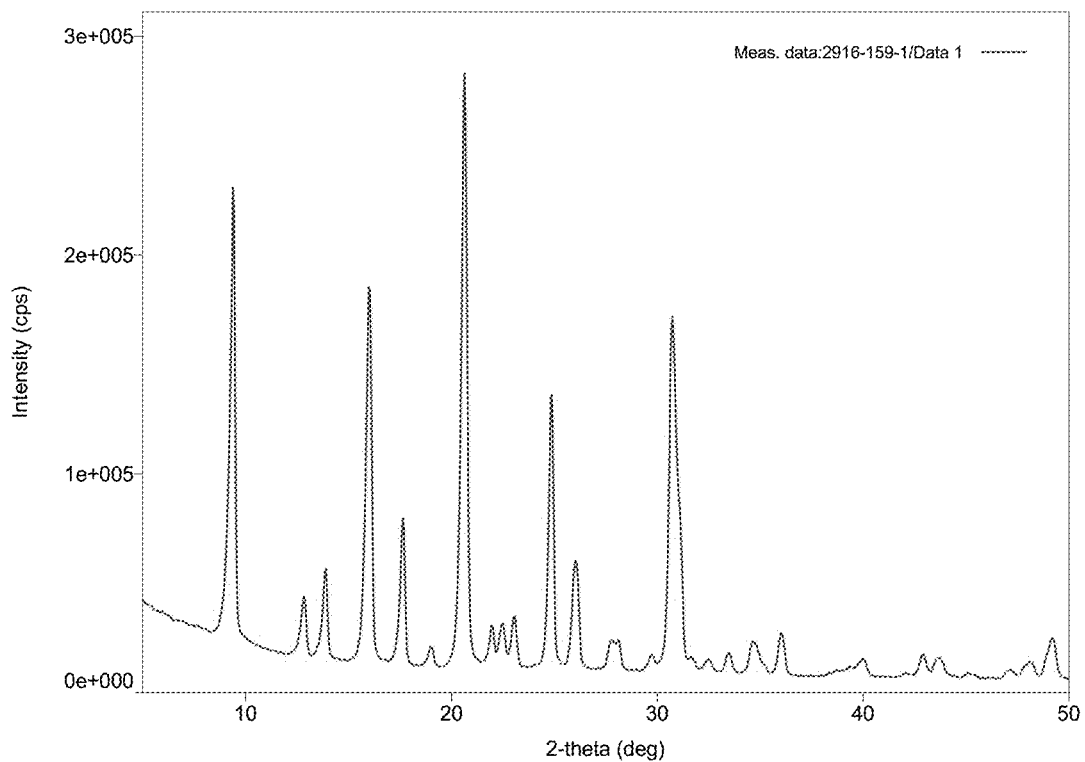
FIG. 3. is an X-ray diffraction pattern of an inventive chabazite product made according to Example 7.

Example 7—Synthesis of 13 SAR Chabazite 200 grams of DI water, 375 grams of N,N,N-Trimethyl-1-adamantylammonium hydroxide (Sachem, 25 wt % solution), 15 grams of potassium hydroxide (EMD Millipore, 71.4 wt % $K_2O$), and 20 grams of sodium hydroxide (Southern Ionics, 50 wt % solution) were first mixed together. Next, 664 grams of silica sol (Nalco, 40 wt % $SiO_2$) was added to the mixture. Then 94 grams of sodium aluminate (Southern Ionics, 23.5 wt % $Al_2O_3$) was added to the mixture. Next 132 grams of aluminum sulfate solution (7.6 wt % $Al_2O_3$) was added. Finally, 3.6 grams of seed material with CHA topology was added. The molar composition of the gel was [13.4 $SiO_2$:1:0 $Al_2O_3$:0.3 $K_2O$:1.4 $Na_2O$:1.3 TMAAOH:174 $H_2O$]. The resulting gel was crystallized at 160° C. for 48 hours in a stainless steel autoclave (Parr Instruments, 2000 ml) while stirring at 150 RPM. The recovered solid was filtered, rinsed with DI water and dried in air at 105° C. overnight. The as-synthesized product had the X-ray diffraction pattern of chabazite, a $SiO_2/Al_2O_3$ ratio (SAR) of 13.0 as summarized in Table 1. The XRD pattern of Example 7 is shown in FIG. 3. The average SEM crystal size of Example 6 is 1.3 microns.

Example 8—Calcination of 13 SAR CHA at 550° C.

The dried zeolite powder from Example 7 was calcined in air for 1 hour at 450° C., followed by 6 hours 550° C. using a ramp rate of 3° C./min. After calcination, the sample was ammonium exchanged with an ammonium nitrate solution. After the ammonium exchange, the sample had an SAR of 13.0, $Na_2O$ of 0.00 wt % and $K_2O$ of 0.11 wt %. The acidity of the ammonium-exchanged sample determined by n-propylamine adsorption was 1.68 mmol/g. The ammonium exchanged exhibited the properties summarized in Table 1.

Example 9—Cu-Exchange of Example 8

The ammonium exchanged zeolite from Example 8 was Cu-exchanged with Cu-nitrate to achieve a CuO content of 5.0 wt % CuO. This Cu-exchanged material was further steamed at 775° C. for 16 hours in 10% $H_2O$/air.

Comparative Example 1—Calcination of 14 SAR CHA at 650° C.

The dried zeolite powder from Example 1 was calcined in air for 1 hour at 450° C., followed by 6 hours 650° C. using a ramp rate of 3° C./min. After calcination, the sample was ammonium exchanged with an ammonium nitrate solution. After the ammonium exchange, the sample had an SAR of 13.5, $Na_2O$ of 0.00 wt % and $K_2O$ of 0.16 wt %. The acidity of the ammonium-exchanged sample determined by n-propylamine adsorption was 1.34 mmol/g.

Comparative Example 2—Cu-Exchange of Comparative Example 1

The ammonium exchanged zeolite from Comparative Example 1 was Cu-exchanged with Cu-nitrate to achieve a CuO content of 5.0 wt % CuO. This Cu-exchanged material was further steamed at 800° C. for 16 hours in 10% $H_2O$/air.

Comparative Example 3-14 SAR CHA

A 14.1 SAR CHA was synthesized from a gel containing DI water, N,N,N-Trimethyl-1-adamantylammonium hydroxide, potassium hydroxide, sodium hydroxide, silica sol, sodium aluminate, aluminum sulfate solution and seed material with CHA topology. The recovered solid was filtered, rinsed with DI water and dried. The as-synthesized product had the X-ray diffraction pattern of chabazite, and a $SiO_2/Al_2O_3$ ratio (SAR) of 14.1. After calcination, the sample was ammonium exchanged with an ammonium nitrate solution. The acidity of the ammonium-exchanged sample determined by n-propylamine adsorption was 1.19 mmol/g.

Comparative Example 4—Cu-Exchange of Comparative Example 3

The ammonium exchanged zeolite from Comparative Example 3 was Cu-exchanged with Cu-nitrate to achieve a CuO content of 5.5 wt % CuO. This Cu-exchanged material was further steamed at 775° C. for 16 hours in 10% $H_2O$/air.

TABLE 1

Analytical data for materials prepared in Inventive and Comparative Examples.

| Example | Form | SAR | $Na_2O$ (wt %) | $K_2O$ (wt %) | Acidity (mmol/g) | $Al_f/Al_{tot}$ (atomic ratio) | SA ($m^2$/g) | MPV ($cm^3$/g) |
|---|---|---|---|---|---|---|---|---|
| Example 1 -- Current Invention ||||||||| 
| 1 | As-synthesized | 13.5 | 1.25 | 4.30 | — | — | — | — |
| 2 | $NH_4$-exchanged | 13.5 | 0.00 | 0.22 | 1.60 | 0.73 | 657 | 0.26 |
| 4 | As-synthesized | 12.3 | 2.89 | 3.09 | — | — | — | — |
| 5 | $NH_4$-exchanged | 12.3 | 0.00 | 0.13 | 1.79 | 0.75 | 680 | 0.26 |
| 7 | As-synthesized | 13.0 | 2.86 | 2.65 | — | — | — | — |
| 8 | $NH_4$-exchanged | 13.0 | 0.00 | 0.11 | 1.68 | 0.74 | 729 | 0.29 |
| Comp Ex. 1 | $NH_4$-exchanged | 13.5 | 0.00 | 0.16 | 1.34 | 0.61 | 638 | 0.25 |
| Comp. Ex. 3 | $NH_4$-exchanged | 14.1 | | | 1.19 | 0.56 | | |

The XRD patterns of the Cu-exchanged materials were measured before and after the hydrothermal treatment to obtain the XRD retention and the results are summarized in Table 2. The zeolite prepared using the disclosed methods described herein remained highly crystalline after hydrothermal treatment at 775° C. or 800° C., whereas the comparative examples with low fraction of Al in the zeolite framework had lower XRD retention.

Cu-exchanged versions of inventive and comparative examples were also evaluated for SCR activity, and results are summarized in Table 3. The ammonium exchanged zeolites were Cu-exchanged with Cu-nitrate to achieve a CuO content of 5.0-5.5 wt % CuO. The Cu-exchanged materials were further steamed at 775° C. or 800° C. for 16 hours in 10% $H_2O$/air. The inventive examples with high fraction of Al in the zeolite framework retained a higher stability and had higher NOx conversion at low temperatures such as 150° C. and 200° C.

TABLE 2

Analytical data for materials prepared in Inventive and Comparative Examples.

| Example | Steam-calcination Temperature (° C.) | SAR | CuO (wt %) | XRD retention (%) |
|---|---|---|---|---|
| 3 | 800 | 13.5 | 5.0 | 67 |
| Comp Ex. 2 | 800 | 13.5 | 5.0 | 62 |
| 6 | 775 | 12.1 | 5.4 | 84 |
| 9 | 775 | 12.8 | 5.2 | 76 |
| Comp Ex. 4 | 775 | 14.1 | 5.5 | 11 |

TABLE 3

Analytical data for materials prepared in Inventive and Comparative Examples.

| Example | Steam-calcination Temperature (° C.) | SAR | CuO (wt %) | NOx Conv. at 150° C. (%) | NOx Conv. at 200° C. (%) |
|---|---|---|---|---|---|
| 3 | 800 | 13.5 | 5.0 | 44 | 95 |
| Comp Ex. 2 | 800 | 13.5 | 5.0 | 15 | 44 |
| 6 | 775 | 12.1 | 5.4 | 45 | 96 |
| 9 | 775 | 12.8 | 5.2 | 54 | 99 |

As evident from Table 3, NOx conversion efficiencies at 150° C. and 200° C. were significantly lower for microporous crystalline materials having a fraction of Al in the zeolite framework of less than 0.63 (as determined by n-propylamine adsorption to obtain the fraction of Al in the zeolite framework) even when the materials exhibited a similar molar silica to alumina ratio (SAR) (i.e., ranging from 10 to 15) and the same wt % of copper, as materials having a fraction of Al in the zeolite framework higher than 0.63.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure.

Other embodiments of the invention will be apparent to those skilled in the art from consideration of the specification and practice of the invention disclosed herein. It is intended that the specification and examples be considered as exemplary only, with the true scope of the invention being indicated by the following claims.

What is claimed is:

1. A microporous crystalline material comprising a crystal structure having a CHA framework, a molar silica to alumina ratio (SAR) ranging from 10 to 15 and an acidity ranging from 1.35 mmol/g to 2.0 mmol/g.

2. The microporous crystalline material of claim 1, where the microporous crystalline material has a fraction of Al in the zeolite framework ranges from 0.63 to 1.00 as determined by n-propylamine adsorption.

3. The microporous crystalline material of claim 1, where the SAR ranges from 12-14.

4. The microporous crystalline material of claim 1, further comprising at least one catalytically active metal.

5. The microporous crystalline material of claim 4, where the at least one catalytically active metal comprises copper or iron.

6. The microporous crystalline material of claim 5, wherein the catalytically active metal comprises copper (Cu), which is present in a Cu:Al atomic ratio of at least 0.25.

7. The microporous crystalline material of claim 6, wherein said material has at least 65% XRD retention after steaming at 775-800° C. for up to 16 hours.

8. The microporous crystalline material of claim 1, where said material comprises a mean crystal size ranging from 0.5 to 5 microns.

9. A method of selective catalytic reduction of nitrogen oxides in exhaust gas, said method comprising:
at least partially contacting said exhaust gases with an article comprising a microporous crystalline material comprising a crystal structure having a CHA framework, a molar silica to alumina ratio (SAR) ranging from 10 to 15 and an acidity ranging from 1.35 mmol/g to 2.0 mmol/g.

10. The method of claim 9, where said contacting step is performed in the presence of ammonia, urea, an ammonia generating compound, or a hydrocarbon compound.

11. The method of claim 9, where the microporous crystalline material has a fraction of Al in the zeolite framework ranges from 0.63 to 1.00 as determined by n-propylamine adsorption.

12. The method of claim 9, where the SAR ranges from 12-14.

13. The method of claim 9, further comprising at least one catalytically active metal chosen from copper or iron.

14. The method of claim 13, wherein the catalytically active metal comprises copper Cu, which is present in a Cu:Al atomic ratio of at least 0.25.

15. The method of claim 13, wherein the material has at least 65% XRD retention after steaming at 775-800° C. for up to 16 hours.

16. The method of claim 9, where said material comprises a mean crystal size ranging from 0.5 to 5 microns.

17. A method of making microporous crystalline material having a molar silica to alumina ratio (SAR) ranging from 10 to 15 and an acidity ranging from 1.35 mmol/g to 2.0 mmol/g, said method comprising:
mixing sources of alumina, silica, alkali containing additive, an organic structure directing agent, water and optionally a seed material to form a gel;
heating the gel in an autoclave to form a crystalline CHA product;
calcining said CHA product; and
ammonium-exchanging said CHA product.

18. The method of claim 17, further comprising introducing at least one catalytically active metal into the microporous crystalline material by liquid-phase or solid-phase ion exchange, impregnation, direct synthesis or combinations thereof.

19. The method of claim 18, where the at least one catalytically active metal comprises copper or iron.

20. The method of claim 19, wherein the catalytically active metal comprises copper Cu, which is present in a Cu:Al atomic ratio of at least 0.25.

21. The method of claim 20, wherein the material has at least 65% XRD retention after steaming at 775-800° C. for up to 16 hours.

22. The method of claim 17, wherein the organic structure directing agent comprises N,N,N-Trimethyl-1-adamantylammonium hydroxide.

23. The method of claim 17, where the alkali containing additive comprises a source of potassium or sodium, or a mixture of thereof.

24. The method of claim 17, where said material comprises a mean crystal size ranging from 0.5 to 5 microns.

\* \* \* \* \*